US011892321B2

(12) United States Patent
Srinivasan

(10) Patent No.: US 11,892,321 B2
(45) Date of Patent: Feb. 6, 2024

(54) DEVICE FOR DETERMINING ORIENTATION OF AN OBJECT

(71) Applicant: Tilak Srinivasan, Bangalore (IN)

(72) Inventor: Tilak Srinivasan, Bangalore (IN)

(\*) Notice: Subject to any disclaimer, the term of this patent is extended or adjusted under 35 U.S.C. 154(b) by 450 days.

(21) Appl. No.: 17/291,297

(22) PCT Filed: Nov. 5, 2019

(86) PCT No.: PCT/IB2019/059481
§ 371 (c)(1),
(2) Date: May 5, 2021

(87) PCT Pub. No.: WO2020/095193
PCT Pub. Date: May 14, 2020

(65) Prior Publication Data
US 2022/0003548 A1    Jan. 6, 2022

(30) Foreign Application Priority Data
Nov. 6, 2018   (IN) .............................. 201841042007

(51) Int. Cl.
*G01C 9/32*      (2006.01)
*G01C 9/36*      (2006.01)

(52) U.S. Cl.
CPC  *G01C 9/32* (2013.01); *G01C 9/36* (2013.01)

(58) Field of Classification Search
CPC .................................. G01C 9/32; G01C 9/36
USPC ................................................... 33/377, 390
See application file for complete search history.

(56) References Cited

U.S. PATENT DOCUMENTS

| 4,614,041 A * | 9/1986 | Darton .................... G01C 9/00 33/327 |
| 5,794,355 A | 8/1998 | Nickum |
| 6,543,147 B2 * | 4/2003 | Akieda .................... G01C 9/12 340/440 |

(Continued)

FOREIGN PATENT DOCUMENTS

EP           0312095 A2    4/1989

OTHER PUBLICATIONS

International Search Report dated Mar. 20, 2020, in the PCT Application No. PCT/IB2019/059481.

(Continued)

*Primary Examiner* — George B Bennett
(74) *Attorney, Agent, or Firm* — Trupti P. Joshi

(57) ABSTRACT

The present disclosure discloses a device (100) for determining orientation of an object. The device includes a hollow spherical member (101), which is filled with a fluid medium (109). A plurality of sensors (102) is positioned on a circumference of the hollow spherical member. Further, the device comprises a light source (104) fixed within the hollow spherical member, and a capsule (103) is disposed within the hollow spherical member. The capsule is configured to displace within the hollow spherical member and occupy uppermost point of the hollow spherical member. The capsule covers the one or more sensors at the corresponding uppermost point and, thus blocks impingement of light on to corresponding one or more sensors. The blocked one or more sensors activate or deactivate, and generate a feedback or input signal, which is received by a computing unit (107), to determine orientation of the object.

9 Claims, 3 Drawing Sheets

(56) References Cited

U.S. PATENT DOCUMENTS

| | | | | |
|---|---|---|---|---|
| 6,647,634 B2* | 11/2003 | Yang | ............... | G01C 9/32 |
| | | | | 33/366.23 |
| 8,539,688 B2* | 9/2013 | Wing | ............... | G01C 9/32 |
| | | | | 33/364 |
| 8,800,155 B2* | 8/2014 | Ekchian | ............... | G01C 9/20 |
| | | | | 33/366.15 |
| 9,146,104 B2* | 9/2015 | Smith | ............... | G01C 9/10 |
| 2008/0189967 A1* | 8/2008 | Tosa | ............... | G01C 9/26 |
| | | | | 33/390 |
| 2012/0266470 A1* | 10/2012 | Ekchian | ............... | G01C 9/20 |
| | | | | 33/377 |

OTHER PUBLICATIONS

Written Opinion dated Mar. 20, 2020, in the PCT Application No. PCT/IB2019/059481.

International Preliminary Report on Patentability dated Oct. 26, 2020, in the PCT Application No. PCT/IB2019/059481.

\* cited by examiner

DEVICE FOR DETERMINING ORIENTATION OF AN OBJECT

CROSS-REFERENCE TO RELATED APPLICATIONS

The present application is a § 371 national stage application of International Application No. PCT/IB2019/059481, filed Nov. 5, 2019, which claims the benefit of priority from Indian Application No. 201841042007, filed Nov. 6, 2018.

TECHNICAL FIELD

Present disclosure generally relates to a field of metrology. Particularly, but not exclusively, the present disclosure relates to a device for determining orientation of an object. Further, embodiments of the present disclosure relate to a Capsule Based Inclinometer device, for determining the orientation of the object about pitch, roll and yaw axes of the object.

BACKGROUND OF THE DISCLOSURE

Determining orientation of an object may be useful in numerous applications. One such example is an airborne object, such as an airplane or a helicopter. Orientation of the airborne object is used to aid in determining orientation of the object, and as well as aid in navigation of the object from its current location to a desired location. Generally, in order to describe a particular orientation or position of a rigid object in a 3-dimensional medium, three parameters along the X-axis, Y-axis and Z-axis are considered.

Conventionally, Euler angles are used to represent both the position and orientation of the rigid body. A local co-ordinate system having the following axes is denoted by X, Y and Z which constitute the axes of frame and another co-ordinate system X, Y and Z which constitute the axes of the rotated frame. By using these co-ordinates both position and orientation of the rigid body can be determined, wherein, the reference orientation can be imagined to be a first orientation from which the frame virtually rotates to reach its actual orientation.

A Myriad of devices such as gyroscopes, gimbals etc., are used in vehicles and aircrafts to determine the pitch, roll and yaw axes which play a key role in determining the orientation and positioning the vehicle/aircraft. A gyroscope works on the principle of angular momentum which basically is the amount of rotation an object taking into account of its mass and shape. In simple words it is the vector quantity that represents the product of a body's rotational inertia and rotational velocity about a particular axis. However, the gyroscopes and gimbals may include multiple moving parts, which require frequent calibration for exhibiting accurate values. Also, the existing systems or arrangements may include more number of parts, which makes the system bulky and involves complex operational features.

Due to advancement in technology, gravity-based inclinometers or instruments are developed. However, gravity-based inclinometers include complex construction. These conventional inclinometers are bulky and difficult to gauge to a user as prior calculations need to be done for operating such devices. Another limitation of such inclinometers may include the sheer size, which may lead to issues with portability of the device. Nowadays, hand-held inclinometers are widely used in surveying and measurement tasks. However, many factors affect the use of such hand-held inclinometers or in general conventional inclinometers. One such major factor is gravity. These devices may work purely on the gravitational force to measure a particular parameter, such as slope or gradient which is majorly used in land survey. Several other factors that may influence working of the inclinometers may include temperature drifts, vibration, shock, and handling sensitivity.

During operation of such conventional inclinometers, it may be difficult to achieve a steady platform to mount the inclinometers in order to avoid vibration and shocks. This may lead to increase in time for calibrating the inclinometers. Moreover, several conventional analog inclinometers imparted deviations which are more than the acceptable deviation range during recording of the readings and, hence demand for frequent calibration, which is undesired. Further, individual inclinometers are required to measure orientation of the object in individual axis i.e. three inclinometers are required to measure orientation in three axes, which leads to complexity of the entire system.

U.S. Pat. No. 5,794,355 relates to a position sensor, which sensor includes two curved surfaces concentrically aligned to form a container which is filled with a viscous fluid and lighter-weight fluid to form a bubble. The bubble changes position within the container when the sensor is moved, allowing transmitting of beam of radiation from a radiation source, to activate a section of the radiation detector. Based on the section of the radiation detector being activated a position sensing circuitry translates the signal into position co-ordinates.

However, in the conventional position sensors/devices the bubble formed due to two liquids of different viscosities, may be sensitive to small vibrational changes and may even diminish, when the viscosity of the liquid changes due to different operating temperatures of the position sensor, leading to failure of the entire sensor, which is undesired.

The present disclosure is directed to overcome one or more limitations stated above or any other limitation associated with the prior arts.

SUMMARY

One or more shortcomings of the prior art are overcome by the system as disclosed and additional advantages are provided through the device as described in the present disclosure.

Additional features and advantages are realized through the technique of the present disclosure. Other embodiments and aspects of the disclosure are described in detail herein and are considered a part of the claimed disclosure.

In one non-limiting embodiment of the present disclosure, a device for determining orientation of an object is disclosed. The device comprises a hollow spherical member, which is filled with a fluid medium. Further, the device comprises a plurality of sensors, which are positioned on a circumference of the hollow spherical member. Furthermore, the device comprises a light source, which is provided within the hollow spherical member. The light source is configured to illuminate the hollow spherical member and the light illuminated by the light source is received by the plurality of sensors. Additionally, the device comprises a capsule, which is disposed within the hollow spherical member. The capsule occupies an uppermost point within the hollow spherical member due to difference in density of the capsule and the fluid medium. Further, the capsule is configured to displace within the hollow spherical member, corresponding to tilt of the hollow spherical member, and block impingement of light on one or more sensors of the plurality of sensors, at the corresponding uppermost point within the hollow spherical member for determining orientation of the object.

In an embodiment, the fluid medium is at least one of water and oil.

In an embodiment, density of the capsule is lesser than density of the fluid medium filled within the hollow spherical member.

In an embodiment, the hollow spherical member comprises an inner surface and an outer surface defining a cavity, and the plurality of sensors are positioned within the cavity.

In an embodiment, the hollow spherical member comprises an inner surface and an outer surface defining a cavity. The plurality of sensors are positioned at predetermined locations, within the cavity.

In an embodiment, the light source is fixed to inner surface of the hollow spherical member by at least one of a rod member, a holder member and a post member.

In an embodiment, wherein the light source is at least one of fluorescent lamp, incandescent lamp and light emitting diode bulb.

In an embodiment, the uppermost point of the hollow spherical member is defined, corresponding to tilting of the hollow spherical member.

In an embodiment, the one or more sensors of the, plurality of sensors are configured to activate or deactivate, based on blockage of the light, to generate an input signal.

In an embodiment, the device comprises a computing unit, which is interfaced with each of the plurality of sensors. The computing unit is configured to receive the input signal from the blocked one or more sensors of the plurality of sensors, to determine orientation of the object.

In an embodiment, the inner surface of the hollow spherical member is made of a transparent material to allow impingement of light on to each of the plurality of sensors.

In an embodiment, the capsule is made of an opaque material, to block impingement of light on to the one or more sensors of the plurality of sensors.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the detailed disclosure. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
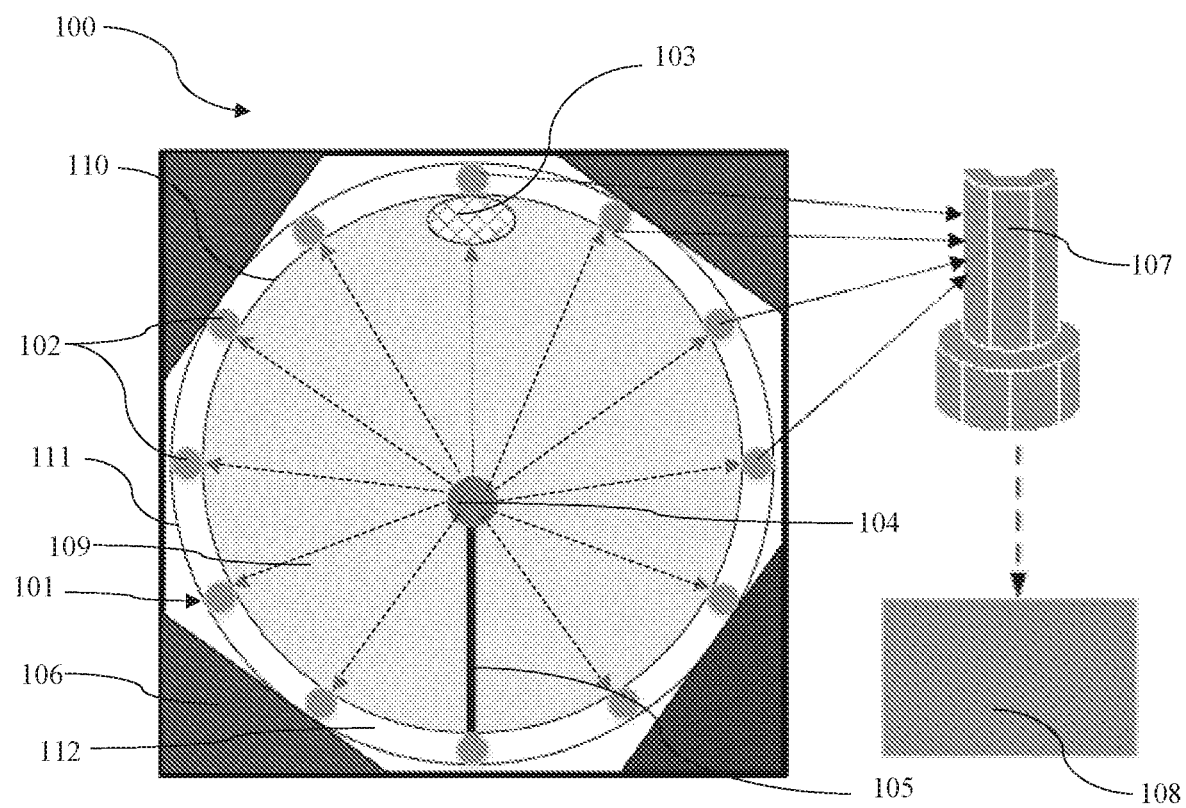
FIG. 1 illustrates sectional view of a Capsule based inclinometer device, in accordance with an exemplary embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE DISCLOSURE

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiment disclosed may be readily utilized as a basis for modifying or designing other devices for carrying out the same purposes of the present disclosure. It should also be realized by those skilled in the art that such equivalent constructions do not depart from the spirit and scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the device is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a system that comprises a list of acts does not include only those acts but may include other acts not expressly listed or inherent to such method. In other words, one or more acts in a method proceeded by "comprises . . . a" does not, without more constraints, preclude the existence of other acts or additional acts in the method.

Embodiments of the present disclosure discloses a device for determining orientation of an object. The device may be a Capsule Based inclinometer device (hereinafter referred as device). Conventional devices, are configured to determine orientation in one axis only. Thus, in order to measure orientation of the object in three axes, three individual device are adapted. Whereas, the device of the present disclosure, facilitate in indication orientation of the object in all the three axes i.e. single device of the present disclosure facilitate in determining orientation of the object in all the three axes.

The device of the present disclosure, may be accommodated within a housing, which may facilitate in positioning or fastening the device on to an object, whose orientation is to be determined. In an embodiment, the device may include a hollow spherical member. The hollow spherical member may be filled with a fluid medium. Further, the device includes a plurality of sensors, which may be positioned on a circumference of the hollow spherical member. Furthermore, the device may include a light source, which is positioned within the hollow spherical member. The light source may be configured to illuminate the hollow spherical member. The light illuminated by the light source in the hollow spherical member, may be received by each of the plurality of sensors. In addition, the device includes a capsule, which may be disposed within the hollow spherical member. The capsule disposed within the hollow spherical member (thus, the fluid medium), may occupy an uppermost point within the hollow spherical member, due to difference in density between the capsule and the fluid medium (i.e. buoyancy effect). Additionally, the device includes a computing unit, which may be interfaced with each of the plurality of sensors and may be configured to receive a feedback signal or an input signal from each of the plurality of sensors to compute orientation of the object.

In an embodiment, the capsule may be configured to displace within the hollow spherical member, based on tilt of the object. Upon tilt or orientation of the object, the capsule displaces and occupies the uppermost point of the hollow spherical member, which is defined based on orientation of the object. Further, the capsule occupying the uppermost point of the hollow spherical member, may block impingement of light on the one or more sensors in the uppermost point, which may be defined based on that particular orientation of the object (thus, the hollow spherical member). The blocked one or more sensors may activate or deactivate based on the configuration, to generate the feedback signal or the input signal. The generated feedback signal or the input signal from the one or more sensors of the plurality of sensors, may be received by a computing unit. The computing unit analyses the input signals and computes the orientation of the object. Orientation of the object about pitch, roll and yaw axes is displayed in one of an analog format or digital format by a display unit.

In the following detailed description, embodiments of the disclosure are explained with reference to accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1, illustrates a sectional view of the device (100), which may be configured to determine orientation of the object about all the three axes. The device (100) may be a capsule based inclinometer device (100). The device (100) may include a hollow spherical member (101). The hollow spherical member (101) may be filled with a fluid medium (109). As an example, the fluid medium (109) may be air, gas, water, oil and any other fluid which serves the same purpose. In an embodiment, the hollow spherical member (101) may include an inner surface (110) and an outer surface (111), between which a cavity (112) may be defined. In an embodiment, the hollow spherical member (101), may include two hemispherical portions [not shown in figures]. The two hemispherical members may be assembled by suitable joining process such as but not limiting to snap fitting, welding, brazing and any other process that serves the purpose. Upon assembling the two hemispheres by suitable joining process at a seam of the two hemispherical members, a hollow spherical member (101) may be formed. In an illustrative embodiment, the device (100) may further include a plurality of sensors (102). The plurality of sensors (102) may be positioned on a circumference of the hollow spherical member (101). As an example, the plurality of sensors (102) may be positioned at predetermined location on the circumference of the hollow spherical member (101). In an embodiment, the plurality of sensors (102) may be positioned within the cavity (112) defined between the inner and outer surface (111) of the hollow spherical member (101).

As apparent from FIG. 1, the device (100) may further include a light source (104). The light source (104) may be provided within the hollow spherical member (101). In an embodiment, the light source (104) may be fixed to the inner surface (110) of the hollow spherical member (101) by at least one of a connecting means such as but not limiting to a rod member (105), a holder member, a post member and the like. The light source (104) may be positioned such that it lies at the lowermost point of the hollow spherical member (101), and is configured to illuminate the hollow spherical member (101), such that the illuminated light (104) may be received by each of the plurality of sensors (102). In an embodiment, the inner surface (110) of the hollow spherical member (101) may be made of a transparent material, to allow impingement of light on to each of the plurality of sensors (102) positioned within the cavity (112) defined between the inner surface (110) and outer surface (111) of the hollow spherical member (101). As an example, the light source (104) may be but not limiting to at least one of a fluorescent lamp, an incandescent lamp, and a light emitting diode bulb.

As seen in FIG. 1, the device (100) may include a capsule (103). The capsule (103) may be disposed within the hollow spherical member (101) i.e. the capsule (103) may be disposed within the fluid medium (109) filled within the hollow spherical member (101). As an example, the capsule (103) may be an air-tight member, having density lesser than the density of the fluid medium (109). In an embodiment, the capsule (103) disposed within the hollow spherical member (101) may occupy an uppermost point within the inner surface (110) of the hollow spherical member (101), due to difference in density of the capsule (103) and the fluid medium (109). In other words, due buoyancy effect, the capsule (103) may occupy the uppermost point of the inner surface (110) of the hollow spherical member (101).

In an embodiment, the device (100) may include a computing unit (107). The computing unit (107) may be interfaced with each of the plurality of sensors (102). In an embodiment, the computing unit (107) may be configured to receive a feedback signal or an input signal generated by each of the plurality of sensors (102). The computing unit (107) may be configured to analyze the feedback or input signals from each of the plurality of sensors (102), and compute orientation of the object in pitch, roll and yaw axes. The computed values by the computing unit (107), may be displayed in at least one of analog form or digital form, by a display unit (108).

In an embodiment, the capsule (103) disposed within the hollow spherical member (101) may be configured to displace within the hollow spherical member (101), upon tilt or orientation of the hollow spherical member (101) (thus, tilt or orientation of the object). In other words, the capsule (103) may be configured to displace within the fluid medium (109), filled in the hollow spherical member (101). In an embodiment, the capsule (103) may displace pointing away from gravity i.e. the capsule (103) displaces and occupies a substantially uppermost position of the hollow spherical member (101), due to difference in density between the capsule (103) and the fluid medium (109) (thus, buoyancy), based on tilt or orientation of the hollow spherical member (101). As an example, the uppermost point may be perpendicular to the horizontal axis (A-A) of the hollow spherical member (101). In an embodiment, the uppermost point of the hollow spherical member (101) is dynamic in nature and, may be defined corresponding to tilt or orientation of the hollow spherical member (101) (thus, the object). Further, the capsule (103) occupying the uppermost point of the hollow spherical member (101), may block impingement of the light on the one or more sensors of the plurality of sensors (102), positioned at the corresponding uppermost point, at that instant of time, based on tilt or orientation of the hollow spherical member (101) (thus, the object). In an embodiment, the one or more sensors of the plurality of sensors (102), which are blocked from impinging light, may activate or deactivate, based on the configuration of the sensors (102). This activation or deactivation of the one or more sensors may generate the feedback signal or the input signal. This feedback signal or the input signal from the one or more sensors may be received by a computing unit (107). The computing unit (107) may be programmed or stored with instructions to analyze the feedback or the input signals, and compute an orientation of the object in pitch, roll and yaw axes i.e. orientation of the object in all three axes. The computed values by the computing unit (107), may be displayed in at least one of analog form or digital form, by the display unit (108).

In an embodiment, the capsule (103) may be made of an opaque material such as but not limiting to frosted glass, acrylic, lamination sheet and the like, to completely block impingement of light on to the one or more sensors, for effective functioning of the device (100).

In an embodiment, the device (100) may be enclosed within a housing (106), which may facilitate in fastening or positioning the device (100) on an object, whose orientation has to be determined. As an example, the housing (106) may assist in fastening the device (100) on to the object via fastening means, such as but not limiting to screw fastening, bolting arrangement, and the like.

Figure 2:
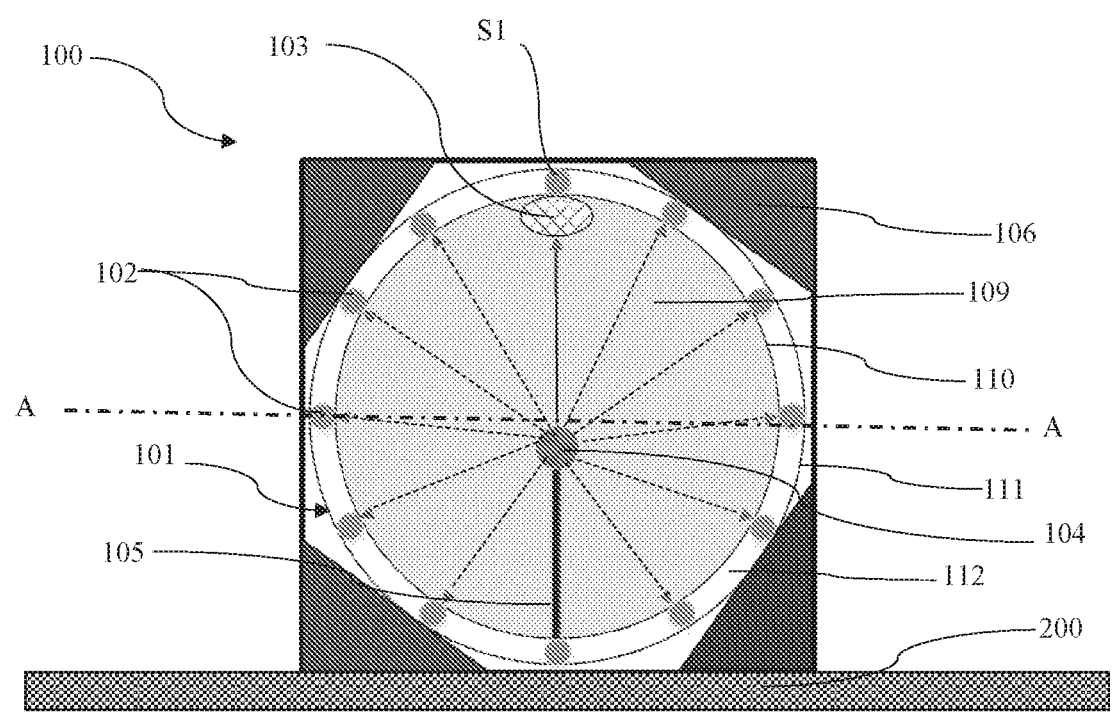
FIG. 2 illustrates the Capsule based inclinometer device of FIG. 1, positioned on an object, which is in equilibrium condition in accordance to an exemplary embodiment of the present disclosure.

Now referring to FIG. 2 which, illustrates the device (100) fixed to the object. As an example, the object may be a platform (200). The platform (200) may be in an idle condition i.e. the orientation or displacement of the platform (200) is zero. Based on the orientation of the object, the capsule (103) may displace within the fluid medium (109) and occupy the uppermost point within the hollow spherical member (101), due to difference in density of the capsule (103) and the fluid medium (109) i.e. due to buoyancy, in an embodiment, the uppermost point of the hollow spherical member (101) may be substantially perpendicular to horizontal axis (A-A) of the hollow spherical member (101). The capsule (103) at the uppermost point, may cover the one or more sensors of the plurality of sensors (102) positioned at the corresponding uppermost point and thus, blocks impingement of light on to the corresponding one or more sensors. In the illustrated embodiment, the capsule (103) may block the sensor S1, which may be at the uppermost point of the hollow spherical member (101). In an embodiment, the uppermost point of the hollow spherical member (101) may continuously vary based on the orientation of the object. The sensor S1, covered by the capsule (103) may activate or deactivate, based on the configuration of the sensor (S1). In an embodiment, the activated or deactivated sensor S1, may generate the feedback signal or the input signal. The feedback or input signal from the blocked sensor S1, may be received by the computing unit (107). In an embodiment, the feedback or input signal generated from the sensor S1 (i.e. the sensor deficient of imping light), corresponds to the orientation of the object about its orientation axis. The computing unit (107) may be programmed to analyze the feedback or the input signals and compute an orientation of the object in pitch, roll and yaw axes. The computed values by the computing unit (107), may be displayed in at least one of analog form or digital form, by the display unit (108).

Figure 3:
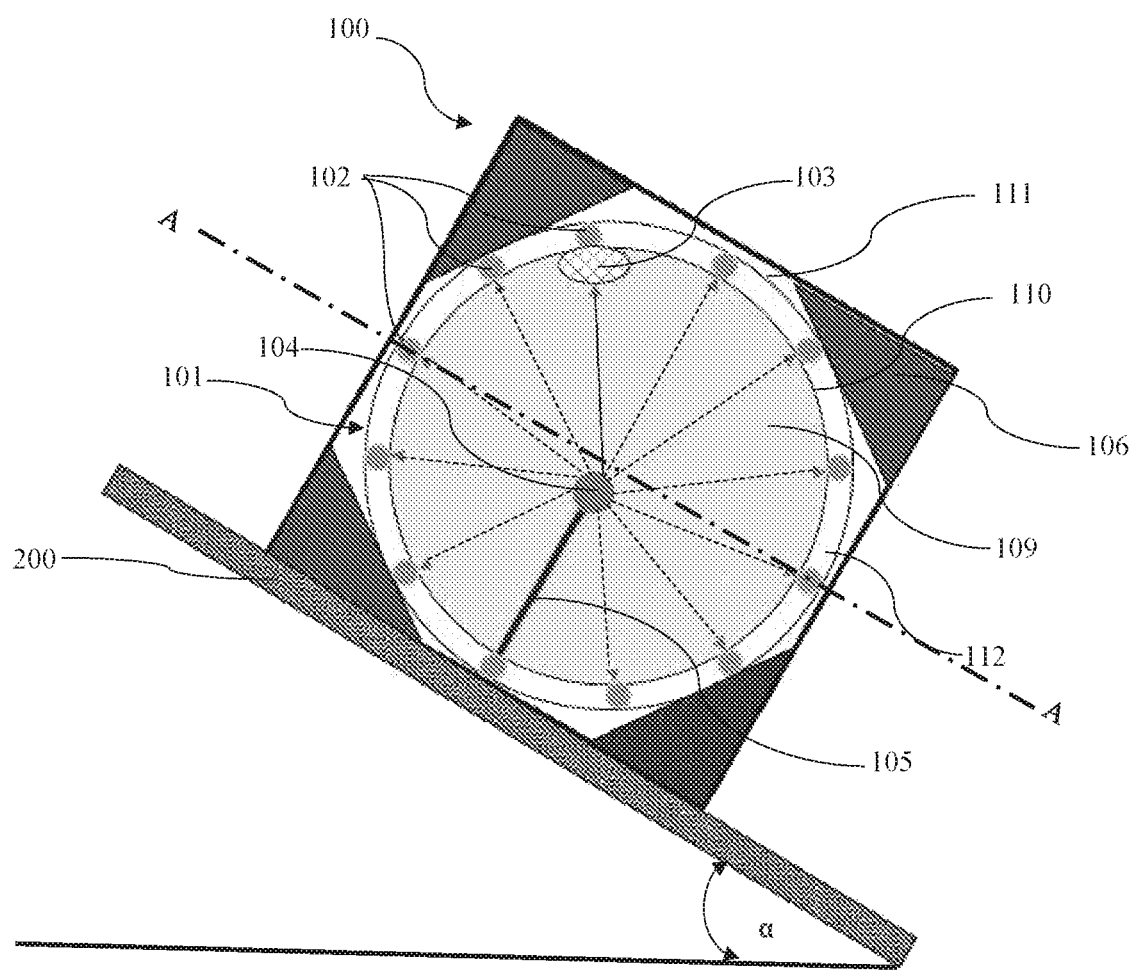
FIG. 3 illustrates the Capsule based inclinometer device of FIG. 1, positioned on the object, which is oriented at an angle α with respect to horizontal, in accordance to an embodiment of the present disclosure.

Now referring to FIG. 3, which illustrates the device (100) positioned on the object. In an illustrative embodiment, the object is oriented at a certain angle α with respect to horizontal.

In an embodiment, due to tilt of the object, the capsule (103) may displace, within the hollow spherical member (101), in order to occupy the corresponding uppermost point of the hollow spherical member (101), which is defined based on the orientation of the object (thus, the hollow spherical member (101)). In other words, the capsule (103) may displace from the uppermost point defined under zero tilt of the object, and occupy the corresponding uppermost point, which is defined corresponding to tilt or orientation of the object, in an illustrative embodiment, the capsule (103) occupying the uppermost point of the hollow spherical member (101), may cover the S3, which are positioned at the corresponding uppermost point of the hollow spherical member (101). In an embodiment, the activated or deactivated sensor S3 may generate the feedback or input signal. The feedback or input signal from the blocked sensor S3 may be received by the computing unit (107). In an embodiment, the feedback or input signal generated from the sensor S3 (i.e. the sensor deficient of imping light), corresponds to the orientation of the object about its orientation axis. The computing unit (107) may be programmed to analyze the input signals and compute an orientation of the object in pitch, roll and yaw axes with respect to the horizontal. The computed values by the computing unit (107), may be displayed, in at least one of analog form or digital form by the display unit (108).

In an embodiment, the computing unit (107) may receive feedback signals from one or more sensors of the plurality of sensors (102) in an embodiment, the capsule (103) may displace within the hollow spherical member (101), based on tilt or orientation of the object, and occupy the corresponding uppermost point and block impingement of light on the one or more sensors at the corresponding uppermost point. Thus, the computing unit (107) continuously receives feedback or input signals from the blocked one or more sensors and thus, computes the orientation of the object, continuously for any change in the tilt/orientation of the object.

In an embodiment, the uppermost point of the hollow spherical member (101) may change continuously, based on orientation of the object. Thus, the capsule (103), blocks the one or more sensors in the uppermost point of the hollow spherical member (101) at that instant of time, and thus facilitates in determining orientation of object.

In an embodiment, the hollow spherical member (101) is configured as leak proof, in order to prevent leakage of the fluid medium (109) filled within the hollow spherical member (101).

In an embodiment, the object may be at least one of automobiles, aircrafts, ships and the like.

In an embodiment, the transparent material of the hollow spherical member (101) may be, but not limiting to glass, fiber glass, fiber plastic and the like.

In an embodiment, the plurality of sensors (102) are at least one of light sensors, photoelectric sensors, proximity sensors, photovoltaic sensors or any other sensor that serves the purpose.

In an embodiment, the hollow spherical member (101), may be filled with a substantially dark colored liquid, in which a bubble may be introduced within the liquid. The colored liquid may tint the light emitted from the light source, and the bubble may occupy the uppermost point of the hollow spherical member. When the light from the light source hits the bubble at the uppermost point in the hollow spherical member, the bubble may allow light to impinge on to the one or more sensors at the corresponding uppermost point. The one or more sensors receiving the light, may generate an input signal, in order to determine orientation of the object about all the three axes.

In an embodiment, the computing unit (107) may include an I/O interface, a memory a processor [not shown in Figures]. The I/O interface may be adapted to receive input data from the plurality of sensors (102). The data received by the I/O interface may be stored in the memory, which may be utilized by the processor for determining the orientation of the object. The memory may also include computing instructions for determining the orientation of the object.

In an embodiment, the capsule (103) blocking impinging light on the sensor S1, at idle position of the object and, blocking the impinging light on to the sensor S3, at oriented position of the object, is for the purpose of illustration only, and the same may not be considered as a limitation.

In an embodiment, the Capsule Based Inclinometer device (100), facilitates in determining displacement or orientation of the object in all the three axes.

In an embodiment, the Capsule Based Inclinometer device (100), is simple in construction.

In an embodiment, due to simple construction, the Capsule based inclinometer device (100) is economical for manufacture.

In an embodiment of the present disclosure, the orientation determination of a particular object can be determined by the Capsule Based inclinometer device (100) provisioned with at least one or combination of the following but not limiting to analog markings, use of sensors (102) or any other similar orientation measuring techniques which are known in the art.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Description | Referral Numeral |
| --- | --- |
| Capsule Based Inclinometer device | 100 |
| Hollow spherical member | 101 |
| Plurality of sensors | 102 |
| Capsule | 103 |

-continued

| Description | Referral Numeral |
| --- | --- |
| Light source | 104 |
| Rod member | 105 |
| Housing | 106 |
| Computing unit | 107 |
| Display unit | 108 |
| Fluid medium | 109 |
| Inner surface of hollow spherical member | 110 |
| Outer surface of hollow spherical member | 111 |
| Cavity | 112 |
| Platform/object | 200 |

I claim:

1. A device (100) for determining orientation of an object, the device (100) comprising:
 a hollow spherical member (101), wherein the hollow spherical member (101) is filled with a fluid medium (109);
 a plurality of sensors (102), positioned on a circumference of the hollow spherical member (101);
 a light source (104), provided within the hollow spherical member (101), the light source (104) is configured to illuminate the hollow spherical member (101), wherein, the light illuminated by the light source (104) is received by the plurality of sensors (102); and
 a capsule (103) manufactured from opaque materials and disposed within the hollow spherical member (101), the capsule (103) occupies an uppermost point within the hollow spherical member (101) due to difference in density of the capsule (103) and the fluid medium (109), the uppermost point occupied by the capsule (103) varies corresponding to tilting of the hollow spherical member (101);
 wherein, the capsule (103) is configured to block impingement of light on one or more sensors of the plurality of sensors (102), at the corresponding uppermost point within the hollow spherical member (101), for determining orientation of the object.

2. The device (100) as claimed in claim 1, wherein the fluid medium (109) in the hollow spherical member (101) is at least one of air and liquid.

3. The device (100) as claimed in claim 1, wherein density of the capsule (103) is lesser than density of the fluid medium (109) filled within the hollow spherical member (101).

4. The device (100) as claimed in claim 1, wherein the hollow spherical member (101) comprises an inner surface (110) and an outer surface (111) defining a cavity (112), and the plurality of sensors (102) are positioned at predetermined locations, within the cavity (112) on the circumference of the hollow spherical member (101).

5. The device (100) as claimed in claim 1, wherein the light source (104) is fixed to an inner surface (110) of the hollow spherical member (101) by at least one of a rod member (105), a holder member and a post member.

6. The device (100) as claimed in claim 1, wherein the light source (104) is at least one of fluorescent lamp, incandescent lamp and light emitting diode bulb.

7. The device (100) as claimed in claim 1, wherein the one or more sensors of the plurality of sensors (102) are configured to activate or deactivate, based on blockage of the light, to generate an input signal.

8. The device (100) as claimed in claims 1 and 7, comprises a computing unit (107), interfaced with each of the plurality of sensors (102), wherein the computing unit (107) is configured to receive the input signal from the one or more sensors of the plurality of sensors (102), to determine orientation of the object.

9. The device (100) as claimed in claim 1, wherein the inner surface (110) of the hollow spherical member (101) is made of a transparent material to allow impingement of light on to each of the plurality of sensors (102).

* * * * *